United States Patent [19]
Schmidt et al.

[11] Patent Number: 5,790,867
[45] Date of Patent: Aug. 4, 1998

[54] COMPILER WITH EXTENDED REDUNDANT COPY ELIMINATION

[75] Inventors: William J. Schmidt; Robert R. Roediger, both of Rochester, Minn.

[73] Assignee: International Business Machines Corporation, Armonk, N.Y.

[21] Appl. No.: 582,202

[22] Filed: Jan. 2, 1996

[51] Int. Cl.$^6$ .......................................................... G06F 9/45
[52] U.S. Cl. ......................................... 395/709; 395/708
[58] Field of Search .................................. 395/705, 709, 395/707, 708

[56] References Cited

U.S. PATENT DOCUMENTS

| | | | |
|---|---|---|---|
| 4,656,583 | 4/1987 | Auslander et al. | 364/300 |
| 4,843,545 | 6/1989 | Kikuchi | 364/300 |
| 5,230,050 | 7/1993 | Iitsuka et al. | 395/700 |
| 5,274,818 | 12/1993 | Vasilevsky et al. | 395/700 |
| 5,293,630 | 3/1994 | Tatge et al. | 395/700 |
| 5,293,631 | 3/1994 | Rau et al. | 395/700 |
| 5,515,535 | 5/1996 | Frankel et al. | 395/700 |
| 5,598,560 | 1/1997 | Benson | 395/707 |
| 5,659,754 | 8/1997 | Grove et al. | 395/709 |

FOREIGN PATENT DOCUMENTS

| | | |
|---|---|---|
| 63-25733 | 2/1988 | Japan . |
| 63-261430 | 10/1988 | Japan . |

OTHER PUBLICATIONS

"CTP-A Family of Optimizing Compiler for the NS32532 Microprocessor", Bendelac et al., Proc. of the IEEE Int'l Conf. on Comp. Design, pp. 247–250, Oct. 1988.

"Incramental Global Optimization for Foster Recompilations", Pollock et al., International Conf. on Computer Languages, pp. 281–290, Mar. 1990.

K. Besaw et al., "Synonyms for common Subexpression Elimination", IBM Technical Disclosure Bulletin. vol.37, No. 12, Dec. 1994, pp. 607–609.

K. Besaw et al., "Monotonically Increasing Counter for Local Code Optimization Algorithm", IBM Technical Disclosure Bulletin, vol. 36, No. 12, Dec. 1993, pp. 663–668.

W. N. J. Tindall, "Computation Reflections in Common Sub-Expression Elimination", IBM Technical Disclosure Bulletin, vol. 25, No. 11A, Apr. 1983, pp. 5465–5468.

H. Y. Saade et al., "Value Numbering in the Context of Merging Control Flow", IBM Technical Disclosure Bulletin, vol. 25, No. 12, May 1983; pp. 6338–6341.

*Primary Examiner*—Emanuel Todd Voeltz
*Assistant Examiner*—Kakali Chaki
*Attorney, Agent, or Firm*—Scott A. Stinebruner

[57] ABSTRACT

A compiler and method of compiling provide extended redundant copy elimination by eliminating copy statements having provably equivalent data items when it is determined that the defined operand of a copy statement has both a non-uniquely reachable use, and an additional, uniquely reachable use that is also a copy statement.

21 Claims, 6 Drawing Sheets

COMPILER WITH EXTENDED REDUNDANT COPY ELIMINATION

FIELD OF THE INVENTION

The invention relates to optimizing compilers and methods of compiling. More particularly, the invention relates to optimizing routines associated therewith for eliminating redundant copy statements.

BACKGROUND OF THE INVENTION

Compilers are generally used to transform one representation of a computer program procedure into another representation thereof. Typically, but not exclusively, compilers are used to transform a human readable form of a program such as source code into a machine readable form such as object code.

One type of compiler is an optimizing compiler which includes an optimizer or optimizing module for enhancing the performance of the machine readable representation of a program. Some optimizing compilers are separate from a primary compiler, while others are built into a primary compiler to form a multi-pass compiler. Both types of compilers may operate either on a human readable form, a machine readable form, or any intermediate representation therebetween.

Many optimizing modules of compilers operate on intermediate representations of computer programs or procedures. Typically a program or procedure being translated is broken down into a series of "statements", each of which contains zero or more "operands" or "data items". A data item may be "defined", meaning that it is given a value by the statement, or "used", meaning that its value is fed into the computation represented by the statement. For example, the statement "x=y+z" defines x and uses y and z.

During optimization, possible paths of execution through a procedure may be represented by a control flow graph (CFG). Statements may be grouped together into basic blocks, which are maximal sequences of straight-line code. In other words, there is no way to branch into or out of a basic block except at the beginning or end. A CFG is a graph with one node for each basic block in the procedure. There is an arc from block A to block B if it is possible for block B to be executed immediately after block A has been executed.

A definition of a data item is said to "reach" a use of that data item if there is a path in the CFG from the definition to the use, along which the data item is not redefined. In this case the use is called a "reachable use" for the definition. If, in addition, the use is not reached by any other definition of the data item, the use is a "uniquely reachable use" for the definition.

One optimization that is typically performed in many compilers is copy propagation, a form of redundant copy elimination, which attempts to remove unnecessary copy statements (e.g., of the form "T=S", where T is a target, or defined operand, and S is a source, or used operand) from a program. Such copy statements may be introduced by the programmer; however, they may also be generated by the compiler, e.g., when the compiler breaks down complex source code into its basic components, and during many optimization phases.

Conventional copy propagation techniques operate by looking for copies of the form "T=S" where each reachable use of the defined operand T is reached only by the copy "T=S" (i.e., each use of T is a "uniquely reachable use".) When such a copy statement is found, all reachable uses of T may be replaced with S and the copy statement can then be eliminated.

While this form of copy propagation has been found to be beneficial in enhancing the performance of computer programs, it has been found that conventional techniques are often too restrictive, and often miss potential optimizations. For example, conventional copy propagation does not allow a copy statement "T=S" to be propagated when one of its reachable uses is not unique—that is, when the use is reached by another definition. However, should one of the other, uniquely reachable uses of the copy statement be in the form of a copy statement "S=T", it should be possible to propagate the first copy statement to this uniquely reachable use, transforming the second copy statement to the equivalent statement "S=S", and subsequently eliminating this statement. However, due to the aforementioned requirement that all reachable uses of a defined operand of a copy statement be unique, no optimization of the second copy statement would occur using conventional copy propagation.

Another form of optimization is global value numbering, which is an optimization that looks for all values, or results of computations, within a procedure and ensures that all values are computed only once. Often, global value numbering can result in some redundant copy statements being eliminated. However, global value numbering is very expensive, as it requires doing a full global dataflow analysis on all operands of all statements in each procedure. Moreover, global value numbering is expensive regardless of whether any opportunities for eliminating redundant copy statements even exist within a computer program. Value numbering may also be performed on extended basic blocks of computer programs; however, this optimization can miss many optimization opportunities.

Therefore, a substantial need has arisen for extended redundant copy elimination which goes beyond conventional copy propagation techniques to further optimize a computer program and thereby improve the resulting performance of the program. Furthermore, a need has arisen for extended redundant copy elimination which is inexpensive in terms of the added processing and analysis performed during compilation of a computer program.

SUMMARY OF THE INVENTION

The invention addresses these and other problems associated with the prior art in providing an extended redundant copy elimination routine for removing or eliminating redundant copy statements during compilation of a computer procedure. The routine performs additional analysis above and beyond conventional copy propagation techniques to eliminate copy statements having provably equivalent data items whenever it is determined that the defined operand of at least one copy statement in the computer program has both a non-uniquely reachable use and an additional, uniquely reachable use that is also a copy statement.

By "provably equivalent data items", what is meant is two data items which are assured to be equivalent irrespective of their actual value during runtime. Accordingly, in the context of the invention, the copy statements removed by the preferred extended redundant copy elimination routines have defined and used operands which are assured to be equivalent, thus rendering the copy statements vacuous.

Under a first preferred embodiment of the invention, for each analyzed copy statement, copy statements with provably equivalent data items are identified by looking for statements which are essentially the reverse of the analyzed copy statement (i.e., those which define the used operand of the analyzed copy statement and use the defined operand of the analyzed copy statement.) In other words, whenever a copy statement of the form "T=S" is determined to have a non-uniquely reached use, other uniquely reachable uses are analyzed to determine if any are copy statements of the form "S=T". If so, those copy statements may be eliminated.

Under a second preferred embodiment of the invention, copy statements with provably equivalent data items are identified by subjecting the entire computer program or procedure to dataflow analysis whenever it is found that the defined operand of any copy statement in the program or procedure has a non-uniquely reachable use and an additional, uniquely reachable use that is a copy statement of the form "X=T", where "dataflow analysis" is understood to mean any method of collecting information about the processing of data within a procedure or program. This has the added benefit of being able to eliminate redundant copies which are not necessarily reversed versions of the analyzed copy statements (as with the first preferred embodiment), thereby providing additional optimization.

It should be understood that in either embodiment, a first step is that of determining whether the defined operand of a copy statement in a computer procedure has a non-uniquely reachable use, and an additional, uniquely reachable use in another copy statement. Should the first step find such a copy statement, a second step of removing any copy statements having equivalent defined and used operands is performed. However, it should also be appreciated that these two steps may be performed in a repeated sequence to analyze each copy statement in a procedure (i.e., with each step executing for individual copy statements in the computer procedure), preferably with the second step limited to analysis of copy statements using the defined operand of the copy statement being analyzed. As an example, the first described embodiment may execute in this manner.

On the other hand, it should further be appreciated that these two steps may each fully analyze a computer procedure, such that each step is executed only once per computer procedure. The second described embodiment, which preferably performs dataflow analysis after the first step is satisfied, may execute in this manner. Preferred embodiments may also utilize combinations of the two techniques consistent with the invention.

Therefore, according to one aspect of the invention, there is provided a method of removing redundant copy statements during compilation of a computer procedure, with each copy statement including a defined operand and a used operand. The method includes the steps of determining if the defined operand of a first copy statement in the computer procedure has a non-uniquely reachable use, and an additional, uniquely reachable use in a second copy statement in the computer procedure; and removing any copy statement having equivalent defined and used operands.

According to a further aspect of the invention, there is provided a method of compiling a computer procedure. The method includes the steps of: (a) optimizing the computer procedure to form an optimized representation, the computer procedure including at least one copy statement, the copy statement including a defined operand and a used operand, the optimizing step including the steps of: (1) determining if every reachable use of a defined operand of a first copy statement in the computer procedure is a uniquely reachable use; (2) if step (a)(1) is true, replacing the used operand in each uniquely reachable use with the used operand in the first copy statement and removing the first copy statement; (3) if step (a)(1) is not true, determining if the defined operand has a uniquely reachable use in a second copy statement in the computer procedure; (4) if step (a)(3) is true, determining if the defined and used operands of any copy statement are equivalent; and (5) removing any copy statement having equivalent defined and used operands; and (b) generating an object code representation of the computer procedure from the optimized representation.

In accordance with a further aspect of the invention, a computer system is provided for compiling a computer procedure into a machine-readable representation, the computer procedure including at least one copy statement which includes a defined operand and a used operand. The computer system includes an optimizer that optimizes the computer procedure into an optimized representation, the optimizer including a redundant copy statement eliminating module that (1) identifies if a first copy statement in the computer procedure has a uniquely reachable use to a second copy statement and an additional, non-uniquely reachable use to another statement, and (2) if so, removes any redundant copy statements which have equivalent defined and used operands; and a machine-readable code generator that generates a machine-readable representation of the computer procedure from the optimized representation.

According to another aspect of the invention, there is provided a program storage device readable by a computer system, the program storage device tangibly embodying a program of instructions executable by the computer system to optimize a computer procedure by eliminating redundant copy statements during compilation of the computer procedure, the computer procedure having at least one copy statement which includes a defined operand and a used operand. The program includes an identifier that identifies if a first copy statement in the intermediate representation has a uniquely reachable use to a second copy statement and an additional, non-uniquely reachable use to another statement; and a redundant copy eliminator, responsive to the identifier, that removes any redundant copy statements which have equivalent defined and used operands.

According to an additional aspect of the invention, a method is provided for transferring a program product to a computer system. The method includes the steps of establishing a connection with the computer system; and transmitting the program product to the computer system. The program product is executable by the computer system to optimize a computer procedure by eliminating redundant copy statements during compilation of the computer procedure, the computer procedure having at least one copy statement which includes a defined operand and a used operand. The program product executes the steps of determining if the defined operand of a first copy statement in the computer procedure has a non-uniquely reachable use, and an additional, uniquely reachable use in a second copy statement in the computer procedure; and removing any copy statement having equivalent defined and used operands.

These and other advantages and features, which characterize the invention, are set forth in the claims annexed hereto and forming a further part hereof. However, for a better understanding of the invention, and the advantages and objectives attained by its use, reference should be made to the Drawing, and to the accompanying descriptive matter, in which there is described preferred embodiments of the invention.

DETAILED DESCRIPTION OF THE PREFERRED EMBODIMENTS

Prior to discussing the operation of the preferred embodiments of the invention, a brief overview discussion of compilers and compiling techniques is provided herein.

Overview of Compilers

Compilers and the like are generally known in the art. See, for example, Alfred V. Aho, Ravi Sethi, and Jeffrey D. Ullman, *Compilers: Principles, Techniques, and Tools*, Addison-Wesley, 1986, which is incorporated by reference herein.

One known type of compiler is a multi-pass optimizing compiler, which includes a front-end module for converting source code into an intermediate representation, and a back-end module which takes the intermediate representation and generates object code therefrom.

The front-end module of a multi-pass optimizing compiler typically includes a lexicographic analyzer which identifies tokens or key words in the source code, and a parser which analyzes the program statement by statement. The parser typically uses a context-free grammar to determine if program statements satisfy a set of grammar rules, and builds constructs therefrom. The parser then generates an intermediate representation using an intermediate code generator.

The back-end module of a multi-pass optimizing compiler typically includes an optimizer or optimizing module which operates on the intermediate representation to generate a revised or optimized intermediate representation. Several different optimizations may be performed, including but not limited to local optimization such as value numbering, elimination of redundant computations, register allocation and assignment, instruction scheduling to match specific machine characteristics, invariant code motion out of loops, strength reduction, induction variable elimination, and copy propagation, among others. The back-end module also includes a final code generator to generate the object code from the revised intermediate representation.

A compiler may reside with in the memory of the computer system upon which the object code generated by the compiler is executed. Alternatively, a compiler may be a cross-compiler which resides on one computer system to generate object code for execution on another computer system. Either type of compiler may be used consistent with the invention. one suitable back-end module for use with the invention is an AS/400 optimizing translator supplied with an AS/400 minicomputer, which is a common back-end module of an optimizing compiler. This product may be used with a front-end module such as the ILE C Compiler available from IBM, among others. It will be appreciated that other compilers, which are suitable for different languages and/or different hardware platforms, may also be used in the alternative.

Computer System

Figure 1:
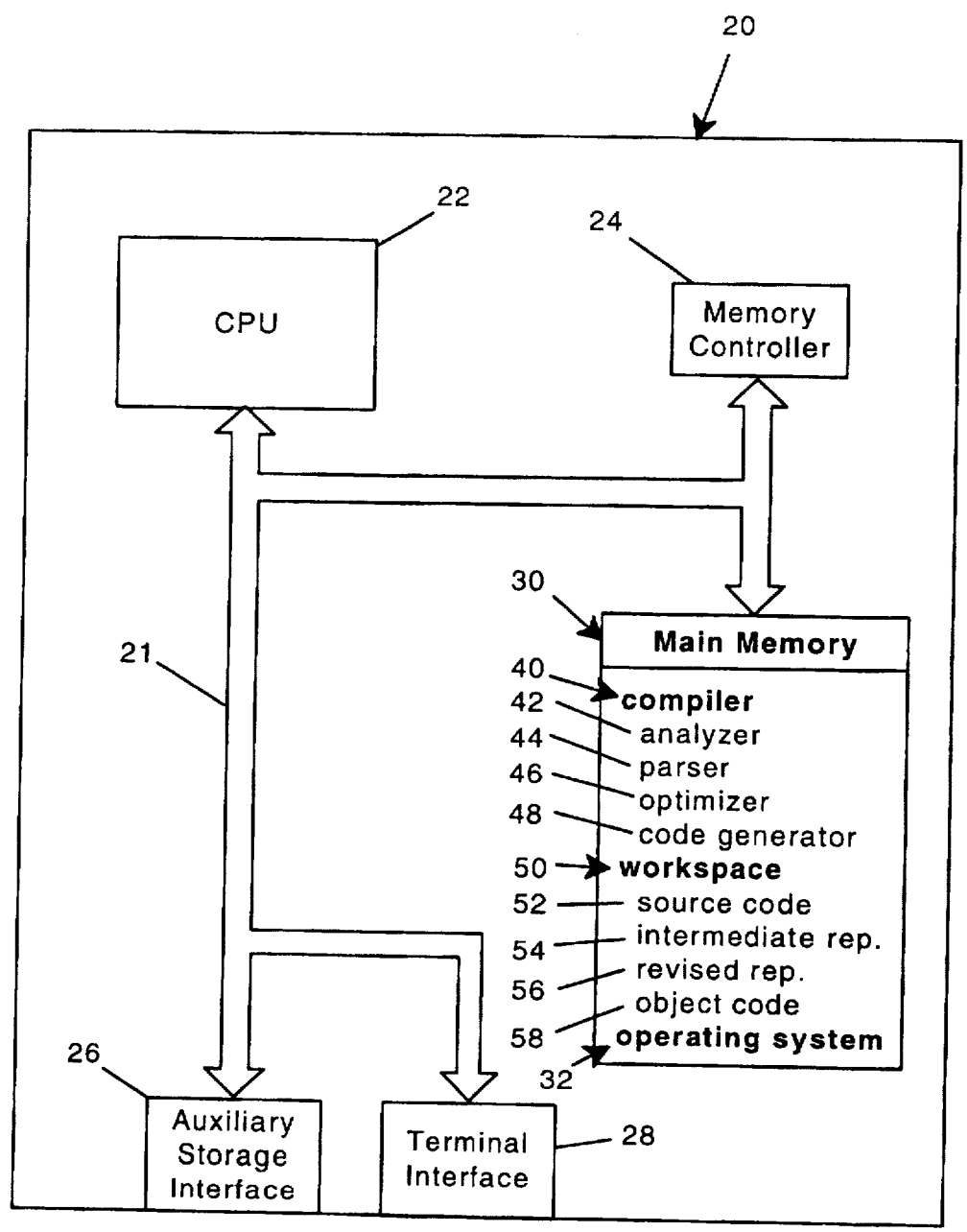
FIG. 1 is a block diagram of a preferred computer system consistent with the invention.

Turning to the Drawing, wherein like numbers denote like parts throughout the several views, FIG. 1 shows a block diagram of a preferred computer system 20 consistent with the invention. Computer system 20 is preferably an IBM AS/400 minicomputer. However, those skilled in the art will appreciate that the mechanisms and apparatus consistent with the invention apply equally to any computer system, regardless of whether the computer system is a complicated multi-user computing apparatus or a single user device such as a personal computer or workstation. As shown in FIG. 1, computer system 20 includes a main or central processing unit (CPU) 22 connected through a system bus 21 to a main memory 30, a memory controller 24, an auxiliary storage interface 26, and a terminal interface 28.

Auxiliary storage interface 26 allows computer system 100 to store and retrieve information from auxiliary storage such as magnetic disk, magnetic tape or optical storage devices. Memory controller 24, through use of a processor separate from CPU 22, moves information between main memory 30, auxiliary storage interface 26, and CPU 22. While for the purposes of explanation, memory controller 24 is shown as a separate entity, those skilled in the art understand that, in practice, portions of the function provided by memory controller 24 may actually reside in the circuitry associated with CPU 22 and main memory 30. Further, while memory controller 24 of the preferred embodiment is described as having responsibility for moving requested information between main memory 30, auxiliary storage interface 26 and CPU 22, those skilled in the art will appreciate that the mechanisms of the present invention apply equally to any storage configuration, regardless of the number and type of the storage entities involved.

Terminal interface 28 allows system administrators and computer programmers to communicate with computer system 20, normally through programmable workstations. Although the system depicted in FIG. 1 contains only a single main CPU and a single system bus, it should be understood that the invention also applies to computer systems having multiple CPUs and buses.

Main memory 30 is shown storing a compiler 40 (comprising analyzer 42, parser 44, optimizer 46 and code generator 48) and operating system 32. Memory 30 also includes a workspace 50 which is shown storing a computer program in various stages of compilation, including a source code representation 52, an intermediate representation 54, an optimized representation 56 and an object code 58. However, it should be understood that main memory 30 will not necessarily always contain all parts of all mechanisms shown. For example, portions of compiler 40 and operating system 32 will typically be loaded into caches in CPU 22 to execute, while other files may well be stored on magnetic or optical disk storage devices. Moreover, the various representations 52-58 of a computer program may not be resident in the main memory at the same time. Various representations may also be created by modifying a prior representation in situ. In addition, as discussed above, the front-end and back-end modules in some systems may be separate programs.

It will be appreciated that computer system 20 is merely an example of one system upon which the preferred routines may execute. Further, as innumerable alternative system designs may be used, the invention should not be limited to any particular configuration shown herein.

It will also be appreciated that the preferred routines may also be considered to be resident at different times on one or more "program storage devices." As used herein, the term "program storage device" may include any device or apparatus capable of storing information such as data or program code either in a volatile or non-volatile manner. Accordingly, a program storage device may comprise memory devices such as RAMs, ROMs, EPROMs, processor and cache memories, flash memories, customized integrated circuits, etc., as well as fixed or removable mass storage medias such as magnetic disks (fixed or removable), CD-ROMs, magnetic tape, etc. In addition, it will be appreciated that the preferred routines may be transferred or downloaded as a program product to a computer system such as computer system 20 via network or modem in lieu of being provided on a storage media such as a floppy disk or CD-ROM, typically by first establishing a connection between the computer system and another server-type computer upon which the program product is stored, and thereafter transmitting the program product to the computer system. Thus, it will be appreciated that a "program storage device" may also include any of the aforementioned memory and storage media of the other server-type computer (e.g., a bulletin board or ftp site) which downloads or transfers a program product to other computer systems but does not actually execute the downloaded or transferred program product.

Operation of Conventional Copy Propagation Routines

Extended redundant copy elimination routines consistent with the invention preferably embody some standard techniques for eliminating some redundant copy statements. Moreover, preferred routines may even be implemented to operate during conventional copy propagation analysis, which greatly reduces the added expense of the extended copy elimination techniques of the invention to a minimal amount above that required under conventional techniques. Consequently, to better explain the operation of the preferred embodiments and the differences between these embodiments and conventional techniques, a brief discussion of a conventional copy propagation routine is provided herein, illustrated as COPY PROPAGATION routine 100 in FIG. 2. However, it will be appreciated that the preferred routines may also operate independently of any conventional copy propagation routines and approaches in the alternative.

Conventional copy propagation typically looks for copy statements that can be eliminated from a procedure without changing the procedure's semantics. When a copy "T=S" is propagated, all reached uses of the copy target or defined operand T are replaced with the copy source or used operand S, and the copy statement is eliminated.

Suppose, for example, that the definition of T in a copy statement "T=S" reaches n uses of T, say in statements $U_1$, $U_2$ . . . . $U_n$. Conventional copy propagation permits copy statement "T=S" to be propagated only if, for each use $U_k$, all of the following are true:

The copy "T=S" is the only definition of T that reaches $U_k$.

Along every path from "T=S" to $U_k$, there is no intervening redefinition of the source data item S, to ensure that T and S represent the same value at $U_k$.

The use of T in $U_k$ is not ineligible for replacement because of machine-specific idiomatic rules. (For example, some machines have instructions that require the same data item to appear as both a use and a definition. Propagating a copy to the use would change the use without changing the definition, resulting in an illegal machine instruction form.) Uses of T are typically divided into local and global uses. A "local use" of T is a reachable use that appears in the same basic block as the copy "T=S". A "global use" of T is a reachable use that appears in some other basic block. Even if a copy is not eligible to be propagated to all of its global uses, it is legal under conventional copy propagation to replace all local uses of T with the source data item S.

One complicating factor is the second-order effects of propagating one copy on other copies. If a copy $C_1$ has been propagated to a use that happens to be in a copy $C_2$, then copy $C_2$ can later be propagated to its uses only if both $C_2$ and $C_1$ are available at the site of each use. For the purposes of discussion below, once $C_1$ has been propagated to copy uses $C_2$, . . . $C_n$, we say that each of $C_2$, . . . $C_n$ has "subsumed" copy $C_1$.

Figure 2:
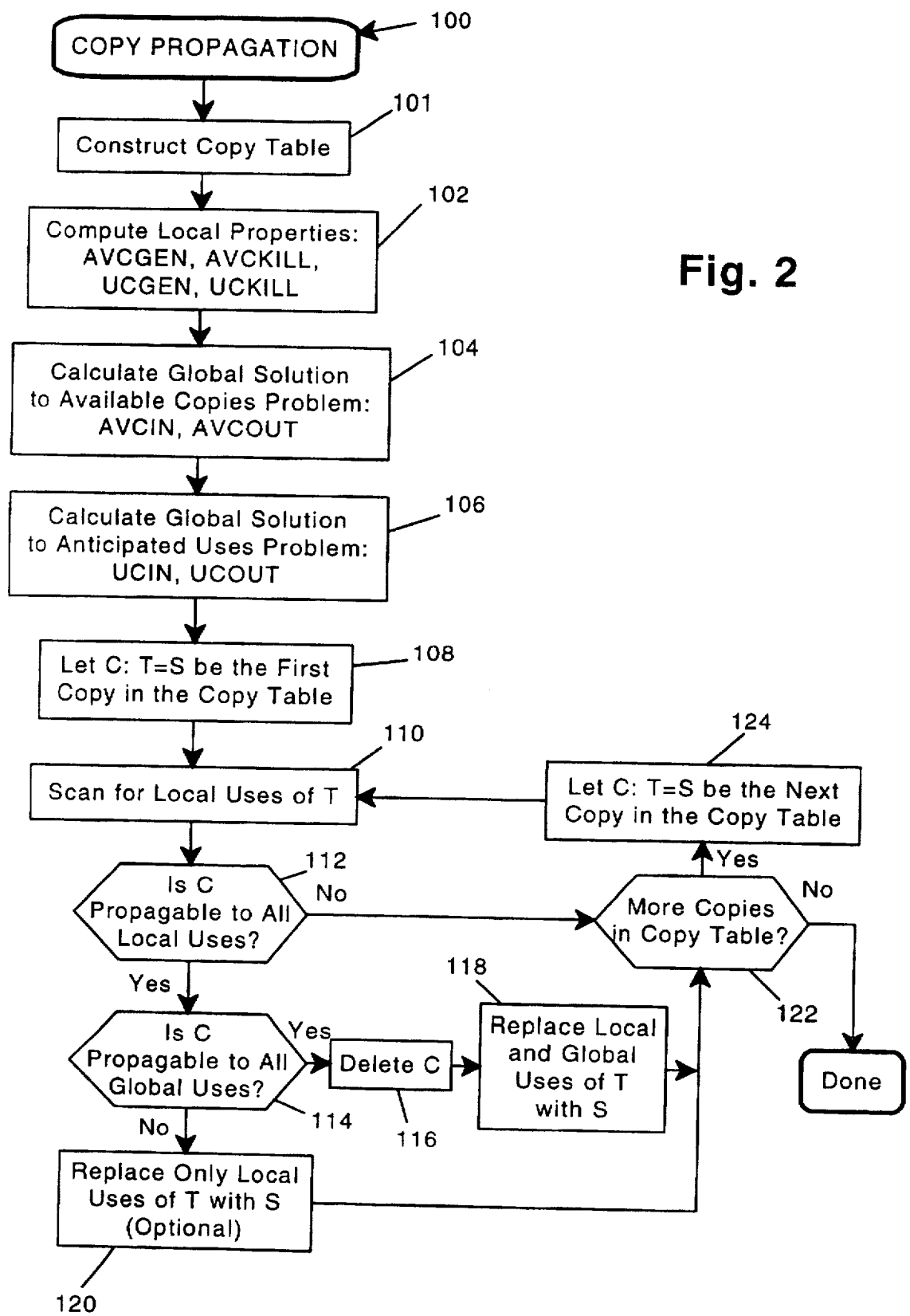
FIG. 2 is a flow chart illustrating the program flow of a conventional copy propagation routine.

Turning to FIG. 2, the first step (block 101) in COPY PROPAGATION routine 100 is to construct a copy table containing information about each copy statement in the procedure being compiled. Entries in the copy table are created by scanning each basic block from its first statement to its last statement. Basic blocks are visited according to a forward dataflow ordering, a manner which is well known in the art.

Next, in block 102, the compiler computes local properties for each basic block. This is a preparatory step performed prior to solving two global dataflow problems: available copies (AVC), and anticipated uses or use-chains (UC).

A solution to the available copies problem determines, for each point P in the procedure (where a "point" is a position between two statements, where the previous statement has been processed, but the subsequent statement has not), which copies are "available" at P in the following sense. A copy "T=S" is available at P if and only if: (1) along every path from "T=S" to P, neither T nor S is redefined; and (2) no other copy "T=S'" with the same copy target is available at P in this sense. Note that, if T or S is a data item kept in memory, it may have aliases—other names for the same storage location—so a redefinition of T or S may also occur under one of these aliases.

A solution to the anticipated uses problem provides a mapping, at each point P in the procedure, from data items to the uses that are anticipated by previous definitions of those data items at P. An "anticipated" use and a "reached" use are one and the same thing.

Block 102 calculates the local properties for each basic block that are important in calculating solutions to the available copies and anticipated uses problems. The basic blocks in the control flow graph are visited in an arbitrary order. Within each block, a forward scan calculates local information for available copies, and a backward scan then calculates local information for use-chains. The following properties are calculated for each block B:

AVCGEN[B]={C|C is a copy statement "T=S" that occurs in B, and neither T nor S is subsequently redefined in B}

AVCKILL[B]={C|C is a copy statement "T=S" that does not occur in B, and either T or S or both is defined in B}

UCGEN[B] is a mapping from data items to uses, such that, for any data item D,

UCGEN[B] (D)={U|U is a statement in B that uses D, and D is not redefined in B prior to U}

UCKILL[B]={D|D is a data item defined in B}

The compiler next determines a global solution for the available copies problem in block 104. This is done by setting up and solving a series of 2b equations with 2b unknowns (where b is the number of basic blocks in the procedure) using a standard iterative technique such as is described in section 10.6 of *Compilers: Principles, Techniques, and Tools* (referenced above).

The equations are formulated in terms of the available copies on entry to a block (AVCIN[B]) and the available copies on exit from a block (AVCOUT[B]), as well as the AVCGEN[B] and AVCKILL[B] constants calculated in block 102:

$$AVCIN[Init] = \phi$$

$$AVCIN[B] = \bigcap_{P \in pred(B)} AVCOUT[P], B \neq Init$$

$$AVCOUT[B] = (AVCIN[B] - AVCKILL[B]) \cup AVCGEN[B]$$

where pred(B) is the set of blocks that are predecessors of block B, and Init refers to a dummy block representing entry to the procedure.

As is well-known to those skilled in the art, this system of equations has many consistent solutions.

When analyzing this problem it is preferred to obtain the largest solution consistent with the equations. For this reason AVCIN[B] and AVCOUT[B] are initialized to the universal set of copies for every block B (except Init). The compiler then solves the equations iteratively: it visits each block B according to a forward dataflow ordering, calculating first AVCIN[B] and then AVCOUT[B]. If, for any block, either AVCIN[B] or AVCOUT[B] changes during this process, the compiler iterates through the equations again. When no changes occur during an iteration, the compiler has found the largest possible fixed point consistent with the equations. This is the desired solution.

Next, in block 106, the compiler computes a global solution for the anticipated uses problem. For this problem, the equations are formulated in terms of the anticipated uses on entry to a block (UCIN[B]) and the anticipated uses on exit from a block (UCOUT[B]), as well as the UCGEN[B] and UCKILL[B] constants calculated in block 102. Note that UCIN[B] and UCOUT[B] are mappings from data items to sets of uses:

$$UCOUT[Exit] (D) = \phi$$

$$UCOUT[B] (D) = \bigcup_{S \in succ(B)} UCIN[S] (D), B \neq Exit$$

$$UCIN[B] (D) = UCGEN[B] (D), D \in UCKILL[B]$$

$$UCIN[B] (D) = UCGEN[B] (D) \cup UCOUT[B] (D), D \notin UCKILL[B]$$

where succ(B) is the set of blocks that are successors of block B, and Exit refers to a dummy block representing exit from the procedure.

Again, this system of equations has many consistent solutions. When analyzing this problem, it is preferred to obtain the smallest solution consistent with the equations. For this reason UCIN[B] and UCOUT[B] are initialized to the empty mapping for every block B. The equations are then solved iteratively in the same manner described above for available copies, except that the blocks are visited according to a backward dataflow order to produce the fastest possible convergence.

Next, in blocks 108–124, the compiler scans through the copy table to determine which copy statements can legally be propagated. These blocks comprise a loop that is executed once for each copy statement in the copy table. During each iteration, C represents the copy statement as a whole, T is the target data item or defined operand of the copy statement, S is the source data item or used operand of the copy statement, and B is the basic block that contains C.

First in block 108, C is initialized to the first copy statement in the copy table. Then, in block 110, the compiler scans forward from C through the end of B, building up a list of local uses of T. During this process, the compiler may discover that the copy is not propagable for one of two reasons. First, the copy is not propagable if a local use of T is found after an intervening redefinition of S (thus not all uses of T are reachable in the sense of available copies.) Second, the copy is not propagable if a local use of T is found that is ineligible for replacement because of machine-specific idiomatic rules.

If either of these situations occurs, the copy is rejected for propagation and control passes to block 122, where, if more copies remain to be processed in the copy table, control passes to block 124 to set C as the next copy statement in the table and return to block 110. Moreover, if a redefinition of T is found before either situation arises, the scan for local uses is successfully terminated and the copy is deemed to have no global uses.

If, at the end of the scan of the block in the previous step, the copy has not been rejected and no intervening redefinitions of T have occurred, UCOUT[B] (T) becomes the list of global uses of T. If the copy has no global uses because of a subsequent redefinition of T in B, this list is empty. The list of global uses is then scanned in block 114 to see whether all uses are reachable from the copy in the sense of available copies. For each use U, say in a block K, the compiler verifies: (1) the copy C is a member of AVCIN[K]; (2) all subsumed copies of C are members of AVCIN[K]; (3) neither T nor S is redefined in K prior to U; and (4) U is not ineligible for replacement because of machine-specific idiomatic rules. If any of these tests are failed, the copy is rejected.

If the copy was not rejected for any of its uses, then the copy statement is eliminated in block 116 and T is replaced by S in all local and global uses of the copy in block 118. Both the copy C and all of its subsumed copies become subsumed copies of each local or global use that is itself a copy.

Otherwise, if the copy is rejected, control passes to block 120 and the copy is optionally propagated only to local uses that can legally accept the propagation. Both the copy C and all of its subsumed copies become subsumed copies of each of these local uses that are themselves copies. In some instances, this step may not optimize the code to a significant extent, and thus, this step is optional.

In either event of the outcome of block 114, control ultimately passes to blocks 122 and 124 to process additional copy statements in the copy table. Once all statements in the table are completed, the routine terminates.

Figure 5:
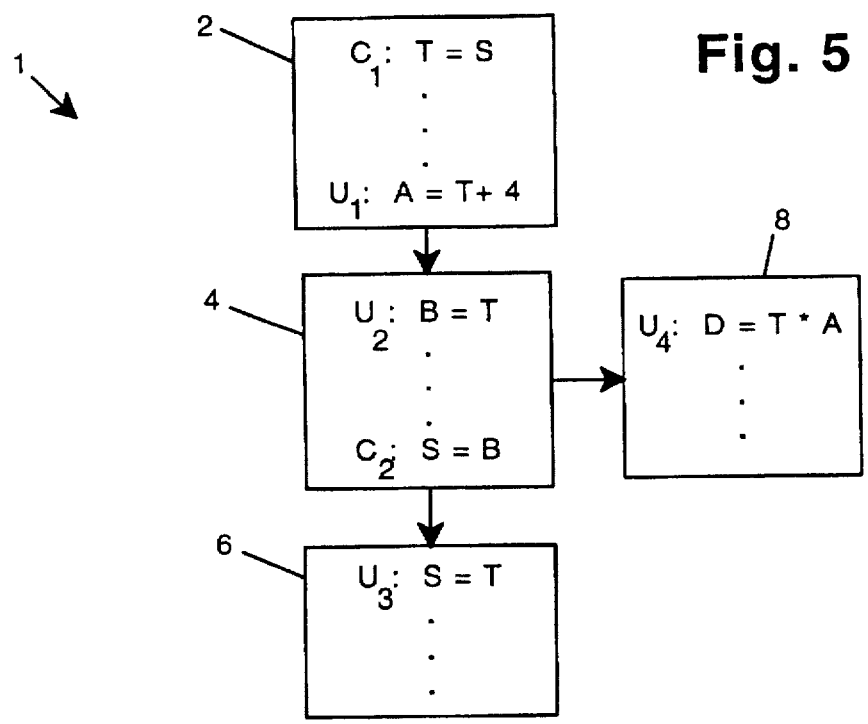
FIGS. 5 and 6 are control flow graphs of exemplary computer procedures for illustrating the operation of the preferred extended redundant copy elimination routines versus conventional copy propagation routines.

As an example of the operation of conventional routine 100, FIG. 5 shows a control flow graph (CFG) for a computer procedure 1 which includes four basic blocks 2, 4, 6 and 8. The local properties calculated in block 102 of routine 100 are:

```
AVCGEN(2) = {C1}    AVCKILL(2) = {U2,U3}
AVCGEN(4) = {U2}    AVCKILL(4) = {C2}
AVCGEN(6) = {U3}    AVCKILL(6) = {C1,C2}
AVCGEN(8) = {C2}    AVCKILL(8) = {C1,U3}
```

-continued

UCGEN(2) = {S→{C1}}  UCKILL(2) = {T,A}
UCGEN(4) = {T→{U2}}  UCKILL(4) = {B}
UCGEN(6) = {T→{U3}}  UCKILL(6) = {S}
UCGEN(8) = {T→{U4},  UCKILL(8) = {D,S}
A→{U4},
B→{C2}}

Next, in blocks 104 and 106, the global solutions to the available copies and anticipated uses problems are calculated. The initial values are:

AVCIN(2)={ }

AVCIN(x)={C1,U2,U3,C2} for all other blocks x≠2

AVCOUT(x)={C1,U2,U3,C2} for all blocks x

UCIN(x)=UCOUT(x)={} for all blocks x

After the dataflow equations are solved iteratively in blocks 104 and 106 as described above, the resulting solutions are:

AVCIN(2)={ }

AVCOUT(2)={C1}

AVCIN(4)={C1}

AVCOUT(4)={C1,U2}

AVCIN(6)={C1,U2}

AVCOUT(6)={U2,U3}

AVCIN(8)={C1,U2}

AVCOUT(8)={C2,U2}

UCOUT(8)={ }

UCIN(8)={T→{U4},A→{U4},B→{C2}}

UCOUT(6)={ }

UCIN(6)={T→{U3}}

UCOUT(4)={T→{U3,U4},B→{C2}}

UCIN(4)={T→{U2,U3,U4},A→{U4}}

UCOUT(2)={T→{U2,U3,U4},A→{U4}}

UCIN(2)={S→{C1}}

From these values, execution of the loop of blocks 110–124 of routine 100 for copy statement $C_1$ in block 2 results in a determination that all reachable uses $U_1$, $U_2$, $U_3$ and $U_4$ of T are unique (i.e., they are only reached by $C_1$). Therefore, routine 100 replaces all uses of T with S and eliminates copy statement $C_1$, resulting in the use equations:

$U_1$: A=S+4

$U_2$: B=S $U_3$: S=S $U_4$: D=S*A

It is to be noted that both $U_2$ and $U_3$ will also be eliminated by routine 100 as they are processed as additional copy statements in the copy table. In particular, $U_3$ will be eliminated as vacuous for having identical defined and used operands. In addition, when C is set to copy statement $U_2$, routine 100 eliminates this statement and replaces defined operand B with used operand S in statement $C_2$ (which is itself then eliminated as vacuous as it becomes "S=S".)

Figure 6:
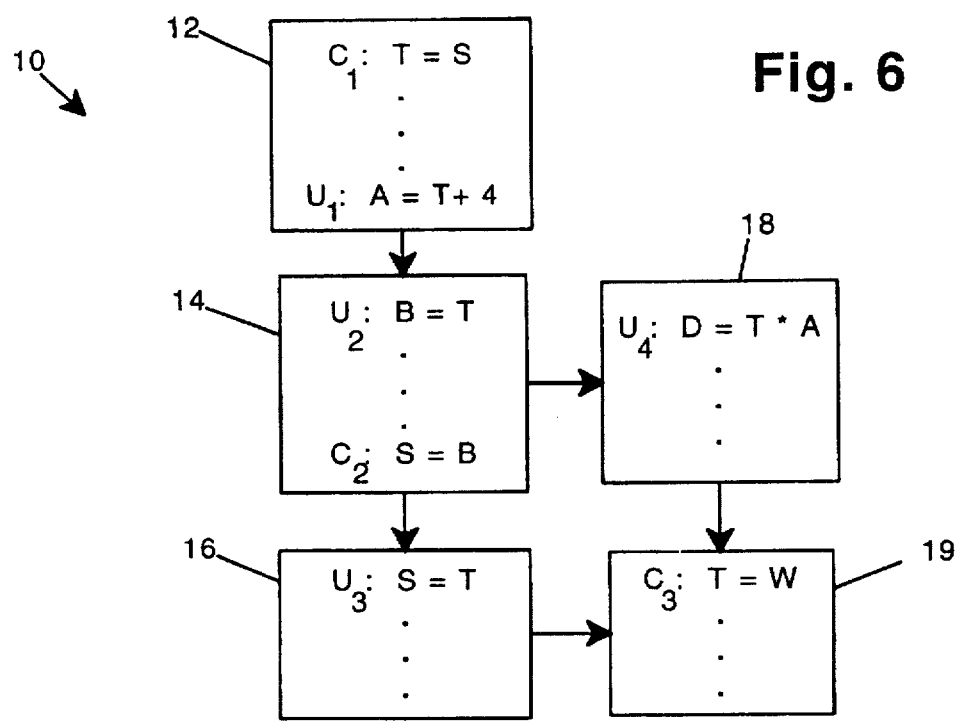

On the other hand, FIG. 6 illustrates the CFG of another computer procedure 10, which includes basic blocks 12, 14, 16 and 18, each of which is respectively identical to blocks 2, 4, 6 and 8 of procedure 1. Procedure 10 also includes a block 19 with an additional definition of T in a copy statement $C_3$. As will be seen, the incorporation of this additional block severely limits the optimization available from routine 100.

Calculation of local properties and global solutions to available copies and anticipated uses in blocks 102–106 of routine 100 generates similar data to that described above for FIG. 5 (with array indices "2", "4", "6" and "8" above are replaced by "12", "14", "16"and "18" as appropriate), and with the additions and exceptions below:

AVCGEN(19)={C3}

AVCKILL(19)={C1,U2,U3}

UCGEN(19)={W{C3}}

UCKILL(19)={T}

AVCIN(18)={U2}

AVCOUT(18)={C2,U2}

UCOUT(19)={T→{U4},B→{C2},A→{U4}}

UCIN(19)={B→{C2},W→{C3},A→{U4}}

From this data, conventional routine 100 will not propagate copy statement $C_1$ at all because one of the reached uses ($U_4$ in block 18) is not unique as it is also reached by copy statement $C_3$. Block 114 (FIG. 2) therefore determines that $C_1$ is not propagable to all global uses, and blocks 116 and 118 are not executed for this statement. If the optional block 120 (FIG. 2) is executed to replace local uses of T with S, then only $U_1$, is replaced, resulting in the modified statement "A=S+4". The remaining global uses of T, however, are not affected by routine 100. It is precisely this aspect of conventional copy propagation routines such as routine 100 that severely limits the potential optimization of many computer procedures.

Operation of Preferred Redundant Copy
Elimination Routines

On the other hand, the preferred embodiments of the invention offer significant improvements over conventional copy propagation routines by looking for copies between equivalent data items (i.e., data items with provably equivalent values at the point of a copy), and thereafter removing these redundant copies from the program. By doing so, some optimization may nonetheless be performed with respect to a copy statement even if all uses of the defined operand in the copy statement are not uniquely reached by the copy statement.

Figure 3:
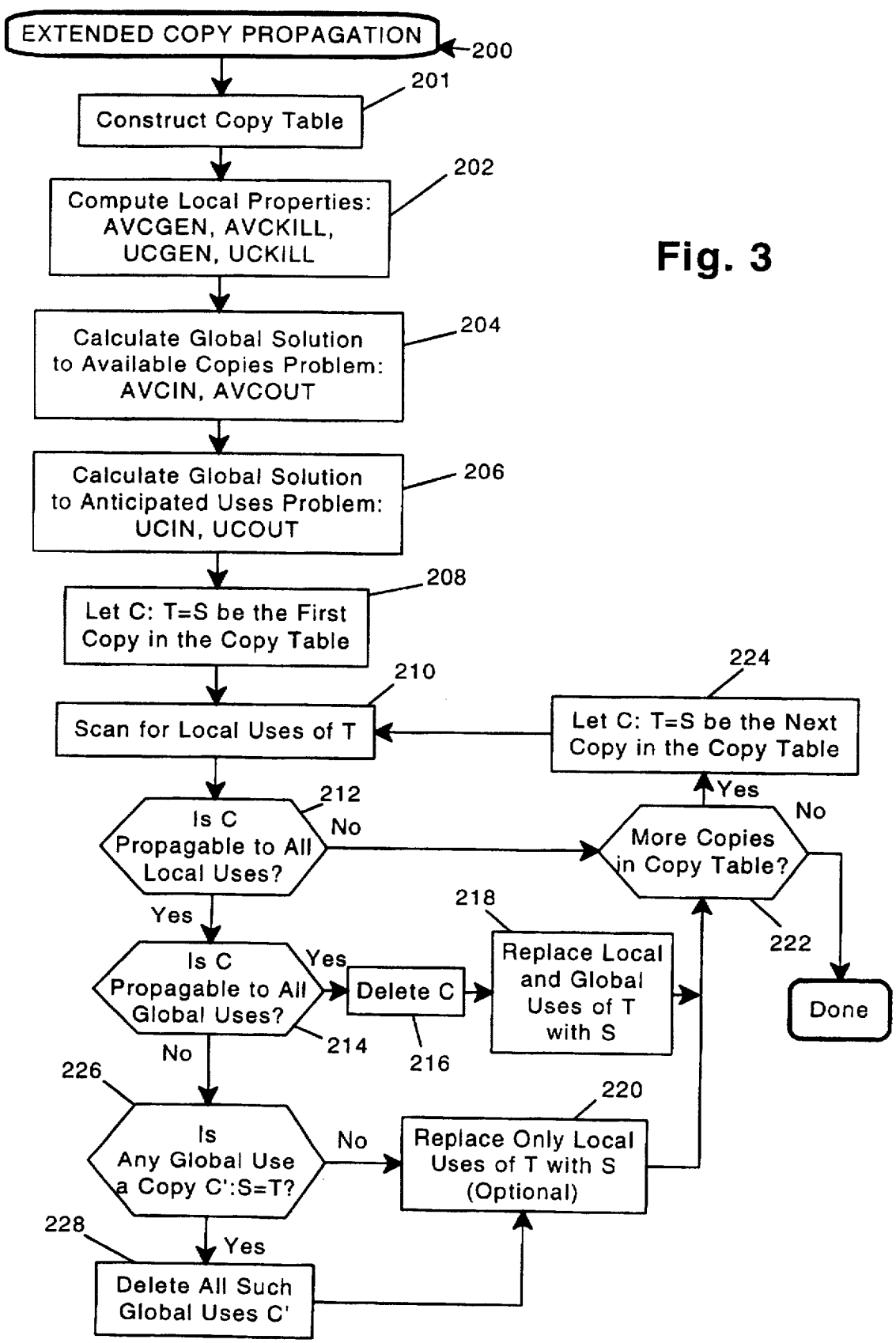
FIG. 3 is a flow chart illustrating the program flow of a first preferred extended redundant copy elimination routine consistent with the invention, and for use in the computer system of FIG. 1.

A first embodiment of the invention, EXTENDED COPY ELIMINATION routine 200, is shown in FIG. 3. Much of this routine is similar to routine 100 of FIG. 2, with each block 2xx being identical in function to the corresponding block 1xx in FIG. 2. The primary difference is the addition of blocks 226 and 228 in routine 200 which implement the extended redundant copy elimination features of the invention.

Essentially, routine 200 differs from routine 100 in that even when a copy statement is not fully propagable throughout a procedure because one of the uses of its defined operand is not uniquely reached by the copy statement, routine 200 will perform additional analysis (here removing any copy statements of the form "S=T") to determine if any uniquely reached uses may be suitable for optimization. This form of extended redundant copy elimination is performed with minimal additional expense since it operates concurrently with conventional copy propagation.

In particular, block 226 acts as an identifier and executes for any copy statement C which is propagable to all local uses, but is not propagable to all global uses (i.e., where at least one use is not a uniquely reachable use of T). Block 226 determines whether any global use of T that was found to be eligible as a propagation target (i.e., any uniquely reachable use) is a copy statement C' of the form "S=T". In such a case, control passes to block 228 which functions as a redundant copy eliminator to eliminate any such copy statements before passing control to block 220 to optionally replace local uses of T with S.

To illustrate the performance of preferred routine 200 as compared to routine 100, reference should again be made to FIGS. 5 and 6.

As to procedure 1 of FIG. 5, copy statement $C_1$ of this procedure is processed by preferred routine 200 essentially in the same manner as with routine 100. This is because all uses of copy statement $C_1$ are uniquely reachable uses, so blocks 226 and 228 are not executed during this pass of the routine.

On the other hand, when preferred routine 200 is used to process computer procedure 10 of FIG. 6, the benefits of this routine over conventional routine 100 are evident. Specifically, with preferred routine 200, after block 214 determines that statement $C_1$ is not propagable to all global uses, block 226 is executed to determine if any global use of T which was found to be a propagable target is a copy statement of the form "S=T". In this case, use $U_3$ is of this form, and accordingly block 228 is executed to eliminate copy statement $U_3$. In addition, as with conventional routine 100, $U_1$ may be replaced by optional block 220 as a local use of T, resulting in the modified statement "A=S+4". Consequently, even though statement $C_1$ is not fully propagable to all reachable uses, at least some optimization is gained through the use of this preferred routine.

Figure 4A:
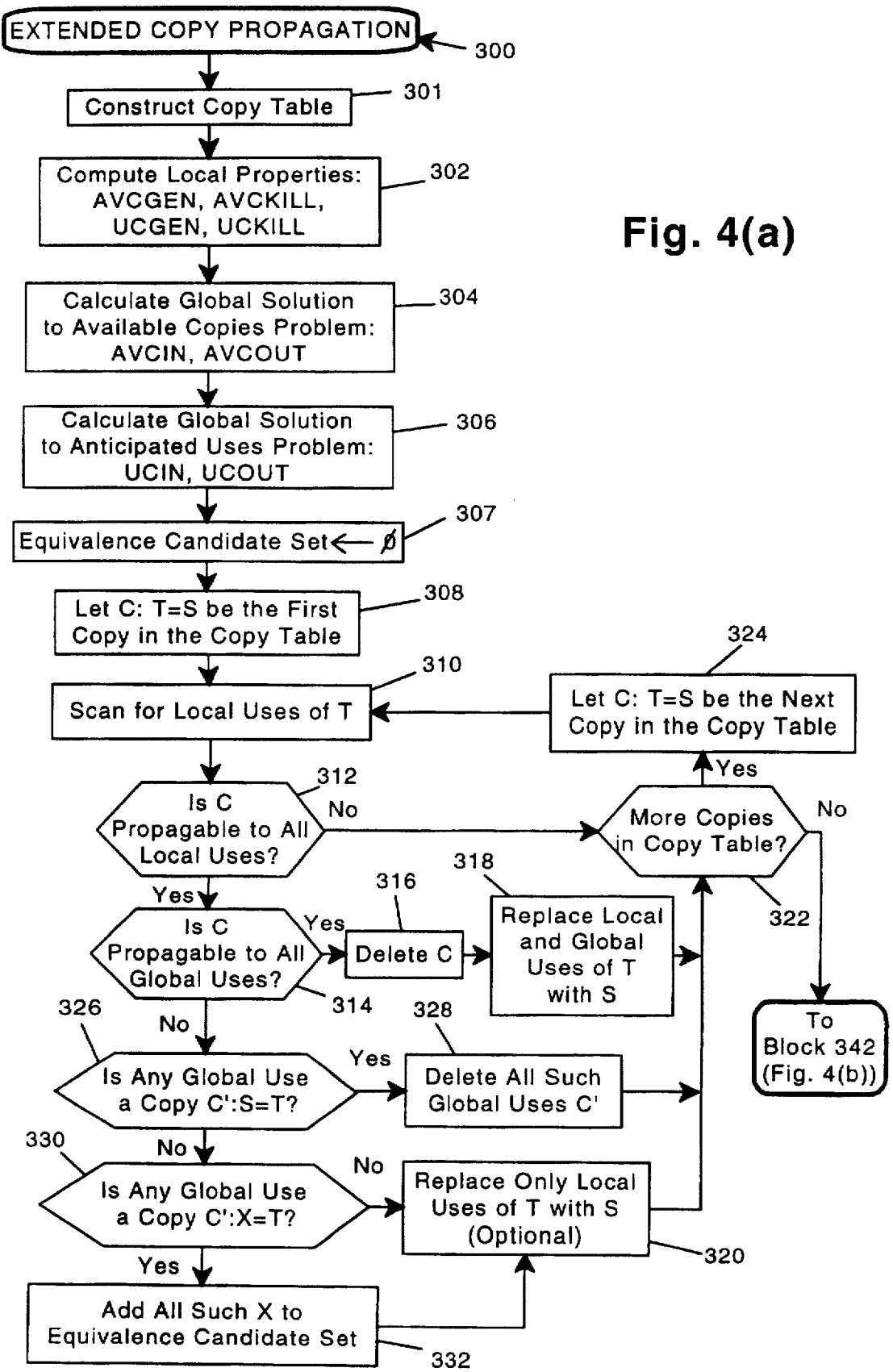
FIGS. 4(a) and 4(b) are flow charts illustrating the program flow of a second preferred extended redundant copy elimination routine consistent with the invention, and for use in the computer system of FIG. 1.
Figure 4B:
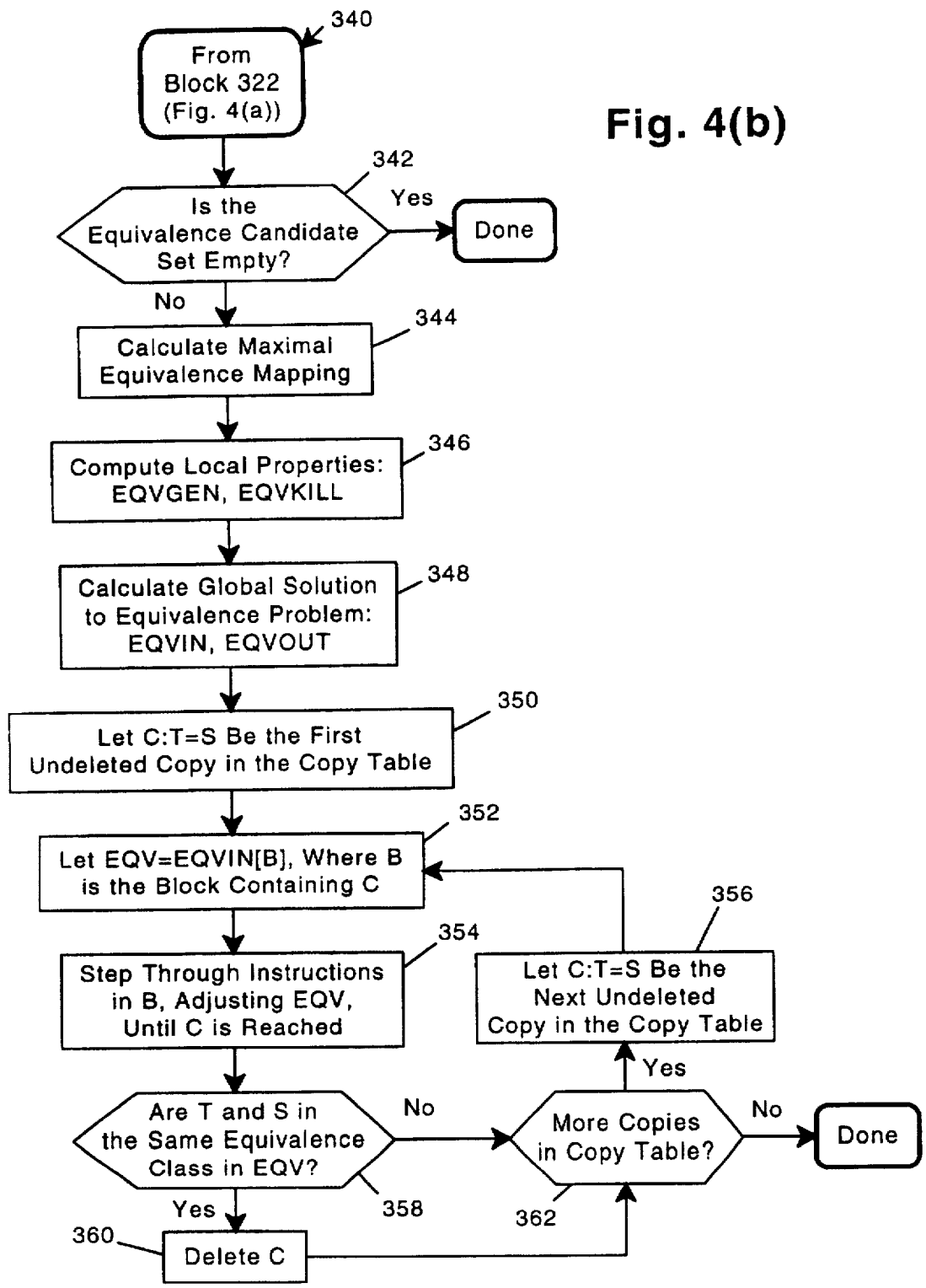

A second embodiment of the invention, EXTENDED COPY ELIMINATION routine 300, is shown in FIGS. 4(a) and 4(b). As with routine 200, part of this routine is similar to routine 100 of FIG. 2, with each block 3xx being identical in function to the corresponding block 1xx in FIG. 2. The primary differences in this routine are the addition of blocks 326, 328, 330 and 332 to the primary loop, the addition of an equivalence candidate set initialization in block 307, and the addition of a dataflow analysis routine 340 (blocks 342-362 of FIG. 4(b)) which implement additional extended redundant copy elimination features of the invention.

Similar to block 226 of routine 200, block 326 of FIG. 4(a) operates as an identifier and executes for any copy statement: C which is propagable to all local uses, but is not propagable to all global uses (i.e., at least one use is not a uniquely reachable use of T). Block 326 determines whether any global use of T that was found to be eligible as a propagation target (i.e., any uniquely reachable use) is a copy statement C' of the form "S=T". In such a case, control passes to block 328 which functions as a redundant copy eliminator to eliminate any such copy statements.

Preferred routine 300 goes beyond routine 200 in that it also includes the concept of an "equivalence candidate set", which is initialized to the empty set in block 307. The equivalence candidate set is built by routine 300 to include "interesting" data items that indicate the potential for extended redundant copy elimination consistent with the invention. Under this further concept, routine 300 attempts to remove copy statements which copy provably equivalent data items, even when the data items are not of the simple form "S=T" (i.e., the reverse of the copy statement "T=S" being analyzed) which are separately and quickly handled in blocks 326 and 328.

In particular, block 330 (which also functions as an identifier) determines if any global use that was eligible as a propagation target is a copy statement of the form "X=T", where X can be any data item or operand other than S. If any such global use meets this test, the defined operand X for this use is added to the equivalence candidate set in block 332, and control is passed to optional block 320. Normal copy propagation then proceeds as with routines 100 and 200 until all copy statements have been processed.

When there are no more copies in the copy table to process, block 322 passes control to block 342 of a DATA-FLOW ANALYSIS routine 340 shown in FIG. 4(b) which functions also as a redundant copy eliminator to perform an additional optimization phase in which data items are placed in equivalence classes and the dataflow of the entire procedure is analyzed to remove any copy statements which copy provably equivalent data items.

First, in block 342 the compiler checks if the equivalence candidate set is still empty. If so, then no additional opportunities for deleting copies were found during the loop of blocks 310-332. In this case, the compiler terminates the redundant copy elimination phase.

Otherwise, control passes to block 344 to calculate the maximal equivalence mapping, as follows. The purpose of the maximal equivalence mapping is to determine the largest possible set of equivalences among copy sources and targets that could possibly be of interest for finding redundant copies. The key point to recognize is that two data items will never be equivalent unless (1) both data items occur in copies somewhere in the program, and (2) there exists some set of copies in the program that, taken together, may cause these two data items to become equivalent.

Thus the maximal equivalence mapping is preferably a partition into potential equivalence classes of the set of all data items that appear as source or target of at least one copy. Two data items are placed in the same equivalence class if they either appear in the same copy or appear in a set of copies that might make them equivalent through transitivity.

To calculate the maximal equivalence mapping, block 344 begins with an empty maximal equivalence mapping, and then processes each copy statement in the copy table in turn. If neither the source nor the target of the copy appears in an existing equivalence class in the mapping, a new equivalence class consisting of just the source and the target is added to the mapping. Otherwise, the equivalence classes of the source and target are merged together into a single equivalence class. If either the source or the target does not yet have an equivalence class, it is added to the equivalence class of the other.

The resulting maximal equivalence mapping is then preferably reduced in block 344 by examining the equivalence candidate set gathered in block 332 of FIG. 4(a). A data item is only of interest for extended redundant copy elimination if its equivalence class contains at least one item in the equivalence candidate set. Thus, any equivalence classes in the maximal equivalence mapping that do not contain at least one item from the equivalence candidate set are preferably discarded. This substantially reduces the size of the mapping, which is important from a performance standpoint when it is used to initialize the dataflow equations (see below).

Next, in block 346 the routine computes local equivalence properties for each basic block. There are two properties of interest for a block B. Let D and D' represent data items. Then the properties are:

> EQVGEN[B] (D)={D'|D and D' are known to contain the same value at the end of B, assuming no data items have the same value at the beginning of B}
>
> EQVKILL[B]={D|D is defined or killed in B}

It will be appreciated that EQVKILL[B] is a subset of UCKILL[B], since the only way that a data item in UCKILL [B] will not be in EQVKILL[B] is if the only definitions of that data item occurred in copies already deleted during copy propagation. Thus, EQVKILL[B] is initialized to UCKILL [B], and then reduced as described below.

EQVGEN[B] is a mapping from data items to equivalence classes of those data items. EQVGEN[B] (D) represents an equivalence class of all data items that D is equivalent to at the end of B, based solely on copies that occur in B.

The local properties are constructed by examining each entry of the copy table as follows. If an entry represents a copy "T=S" that was deleted, then the block B containing the copy is rescanned to see if any definitions or kills of T remain. If not, then T is removed from EQVKILL[B].

Otherwise the entry represents a copy "T=S" that remains. The routine scans forward from the copy to the end of its containing block B. If neither T nor S is redefined or killed during this scan, then the equivalence classes of S and T in EQVGEN[B] are combined.

Next, in block 348 the routine computes a global solution to the equivalence problem. The problem is formulated in terms of the data items known to be equivalent on entry to a block B (EQVIN[B]), and those known to be equivalent on exit from B (EQVOUT[B]), as well as the constants EQVGEN[B] and EQVKILL[B] that were calculated in block 346. For each data item D, the dataflow equations are:

$$EQVIN[Init] (D) = \phi$$

$$EQVIN[B] (D) = \bigcap_{P \epsilon pred(B)} EQVOUT[P] (D), B \neq Init$$

$$EQVOUT[B] (D) = (EQVIN[B] (D) - EQVKILL[B]) \cup EQVGEN[B] (D), D \notin EQVKILL[B]$$

$$EQVOUT[B] (D) = EQVGEN[B] (D), D \epsilon EQVKILL[B]$$

Again, this system of equations has many consistent solutions. To solve this problem, it is preferred to obtain the largest solution consistent with the equations. For this reason EQVIN[B] and EQVOUT[B] are initialized to the maximal equivalence mapping for every block B. The equations are then solved iteratively in the same manner described above for available copies. Note that each iteration except the last will impose a refinement on the equivalence classes for some EQVIN[B] or EQVOUT[B]. The use of the maximal equivalence mapping for initialization allows the routine to find the largest consistent solution without the unacceptable overhead of initializing all EQVIN[B]'s and EQVOUT[B]'s to the universal equivalence mapping; refining the universal equivalence mapping bears too high a cost in memory usage and compile time. Those skilled in the art will recognize that compile time can also be saved by initializing EQVOUT[B] according to the dataflow equations above, assuming that EQVIN[B] contains the maximal equivalence mapping. Thus, for example, if D is in EQVKILL[B], EQVOUT[B] (D) will be initialized to EQVGEN[B] (D).

Next, the routine uses the equivalence data calculated in block 348 to find and remove all remaining vacuous copies. This process is shown in the loop of blocks 351–362 of FIG. 4(b). Each undeleted copy statement in the copy table, e.g. a copy statement "T=S" in block B, is examined as follows. First, if block 351 determines that T and S are the same data item, then the copy is immediately removed by passing control to block 360. Otherwise, a copy of EQVIN[B] (designated "EQV") is made for local use in block 352, which functions as a local equivalence mapping.

Statements of B are then examined in forward order in block 354 until the copy statement is encountered. Defined and killed data items are removed from their equivalence classes in the local equivalence mapping. Copies cause their source and target equivalence classes to be merged in the local equivalence mapping. At the end of this scan, the local equivalence mapping reflects the exact known data item equivalences at the copy statement. Then, if T and S have the same equivalence class in the local equivalence mapping, block 358 passes control to block 360 to eliminate the copy statement.

After each undeleted copy statement in the copy table is processed, control passes to block 362 to determine if any more copies are left in the table. If so, control passes to block 356 to select the next undeleted copy statement in the copy table and continue processing with block 352. If no more undeleted copies are left in the copy table, the routine is completed.

To illustrate the performance of preferred routine 300 as compared to routines 100 and 200, reference should once again be made to FIGS. 5 and 6.

As to procedure 1 of FIG. 5, copy statement $C_1$ of this procedure is processed by preferred routine 300 essentially in the same manner as with routine 100. This is because all uses of copy statement $C_1$ are uniquely reachable uses, so blocks 326 and 328 are not executed during this pass of the routine. Further, routine 300 will terminate at block 342 (FIG. 4(b)) instead of executing blocks 344–362, as no copy statements will be added to the equivalence candidate set in the loop of blocks 310–332.

On the other hand, when preferred routine 300 is used to process computer procedure 10 of FIG. 6, the benefits of this routine are also evident. Specifically, as above with routine 200, block 326 (FIG. 4(a)) of preferred routine 300 determines if any global use of T that was found to be a propagable target is a copy statement of the form "S=T". Since $U_3$ is of this form, block 328 is executed as with routine 200 to eliminate copy statement $U_3$. Also, optional block 320 may propagate $C_1$ to all local uses of T, thereby modifying $U_1$ to the statement "A=S+4".

In addition, routine 300 analyzes at block 330 (FIG. 4(a)) whether any global use of T is a copy statement of the form "X=T" (where X is a variable other than S.) Since statement $U_2$ is of this form, block 332 is executed to add the target of statement $U_2$ (B) to the equivalence candidate set. Once the entire procedure 10 is analyzed in the loop of blocks 310–332, control passes to block 342 of DATAFLOW ANALYSIS routine 340 of FIG. 4(b). Since the equivalence candidate set is not empty, control passes to block 344 to determine if any copy statements in procedure 10 have provably equivalent data items.

In block 344, the maximal equivalence mapping is computed to be:

MaxEqvMap={{B,S,T,W)}}

Next, in block 346, the local properties are calculated to be:

EQVGEN(12) = {{S,T}}          EQVKILL(12) = {T,A}
EQVGEN(14) = {{B,T}}          EQVKILL(14) = {B}
EQVGEN(16) = {} (U3 deleted)  EQVKILL(16) = {}
EQVGEN(18) = {{S,B}}          EQVKILL(18) = {D,S}
EQVGEN(19) = {{T,W}}          EQVKILL(19) = {T}

Next, in block 348, the global solution to the equivalence problem is calculated, with EQVIN and EQVOUT initialized as follows:

EQVIN(12)={ }

EQVIN(19)={ }

EQVIN(x)=MaxEqvMap for all other blocks x≠12,19

EQVOUT(x)=MaxEqvMap for all blocks x

After the dataflow equations are solved iteratively in block 348 as described above, the resulting solutions are:

EQVIN(12)={ }

EQVOUT(12)={{S,T}}

EQVIN(14)={{S,T}}

EQVOUT(14)={{B,S,T}}

EQVIN(16)={{B,S,T}}

EQVOUT(16)={{B,S,T}}

EQVIN(19)={ }

EQVOUT(19)={{T,W}}

EQVIN(18)={{B,S}}

EQVOUT(18)={{B,S}}

As noted above, execution of routine 340 results in T, S and B being put in the same equivalence class at the end of block 14. At the beginning of block 18, however, only S and B are in the same equivalence class, since T is removed by the intersection step. Thus, upon analysis of statement $C_2$ in block 358, S and B are determined to be in the same equivalence class, and copy statement $C_2$ is also eliminated. Consequently, it will be appreciated that improved optimization also results from the use of preferred routine 300.

It will therefore be appreciated that the invention provides significant advantages in terms of optimization of computer procedures during compilation, thereby resulting in better procedure performance. It will also be appreciated that numerous modifications may be made to the preferred embodiments consistent with the invention. For example, the extended copy elimination techniques disclosed herein may be executed separately from conventional copy propagation, instead of being executed in the same "pass" of compilation. In addition, the dataflow analysis of routine 300 may be implemented without separate checking for global uses that are of the form "S=T" as in blocks 326 and 328 of routine 300, as the dataflow analysis will generally handle this situation, albeit less efficiently. Moreover, different initializations may be performed on the working sets analyzed during the preferred routines. Furthermore, other dataflow analysis techniques, e.g., "sparse" dataflow analysis techniques, among others, may be used to determine equivalent data items.

Other modifications may be made to the preferred embodiments without departing from the spirit and scope of the invention. Therefore, the invention lies in the claims hereinafter appended.

What is claimed is:

1. A method of removing redundant copy statements during compilation of a computer procedure, each copy statement including a defined operand and a used operand, the method comprising the steps of:
    (a) determining if the defined operand of a first copy statement in the computer procedure has a non-uniquely reachable use, and an additional, uniquely reachable use in a second copy statement in the computer procedure; and
    (b) removing any copy statement having equivalent defined and used operands.

2. The method of claim 1, further comprising the steps of:
    (a) determining if every reachable use of the defined operand of the first copy statement is a uniquely reachable use; and
    (b) if every reachable use of the defined operand of the first copy statement is a uniquely reachable use, replacing the used operand in each uniquely reachable use with the used operand in the first copy statement and removing the first copy statement.

3. The method of claim 1, wherein the step of removing any copy statement having equivalent defined and used operands comprises the steps of:
    (a) determining if the defined operand in the second copy statement is equivalent to the used operand in the first copy statement; and
    (b) removing the second copy statement.

4. The method of claim 1, further comprising the step of repeating step (a) of claim 1 for every copy statement in the computer procedure to identify if the defined operand of any copy statement in the computer procedure that has a non-uniquely reachable use also has a uniquely reachable use in another copy statement in the computer procedure.

5. The method of claim 4, wherein the step of removing any copy statement having equivalent defined and used operands comprises the step of, after identifying that the defined operand of a copy statement in the computer procedure that has a non-uniquely reachable use also has a uniquely reachable use in another copy statement in the computer procedure, performing dataflow analysis on the computer procedure to identify any copy statements having provably equivalent defined and used operands.

6. The method of claim 5, wherein the step of removing any copy statement having equivalent defined and used operands further includes the steps of:
    (a) prior to performing dataflow analysis, building one or more equivalence classes, each equivalence class including a set of potentially equivalent operands that are operands in at least one common copy statement in the computer procedure; and
    (b) after performing dataflow analysis, determining from the equivalence classes the equivalent operands at each copy statement in the computer procedure that has not been removed prior to performing dataflow analysis; and
    wherein the step of performing dataflow analysis includes the step of modifying the equivalence classes to reflect which data items are equivalent at which copy statements.

7. The method of claim 6, wherein the step of repeating step (a) of claim 1 for every copy statement in the computer procedure includes the step of building an equivalence candidate set including the defined operands of any copy statements which are uniquely reachable uses of the defined operand of another copy statement in the computer procedure that itself has a non-uniquely reachable use, and wherein the performing dataflow analysis step further includes the steps of:

(a) aborting dataflow analysis if the equivalence candidate set is empty; and (b) discarding any equivalence classes not having at least one operand in the equivalence candidate set.

8. The method of claim 1, further comprising the step of, if the first copy statement has a non-uniquely reachable use in a second statement, propagating the first copy statement to any local reachable uses of the defined operand of the first copy statement.

9. The method of claim 1, wherein the computer procedure is in an intermediate representation.

10. A method of compiling a computer procedure, the method comprising the steps of:

(a) optimizing the computer procedure to form an optimized representation, the computer procedure including at least one copy statement, the copy statement including a defined operand and a used operand, the optimizing step including the steps of:

(1) determining if every reachable use of a defined operand of a first copy statement in the computer procedure is a uniquely reachable use;

(2) if step (a)(1) is true, replacing the used operand in each uniquely reachable use with, the used operand in the first copy statement and removing the first copy statement;

(3) if step (a)(1) is not true, determining if the defined operand has a uniquely reachable use in a second copy statement in the computer procedure;

(4) if step (a)(3) is true, determining if the defined and used operands of any copy statement are equivalent; and (5) removing any copy statement having equivalent defined and used operands; and (b) generating an object code representation of the computer procedure from the optimized representation.

11. The method of claim 10, further comprising the step of, prior to the optimizing step, generating an intermediate representation from a source code representation of the computer procedure.

12. The method of claim 10, wherein step (a)(4) of claim 10 includes the step of determining if the defined operand in the second copy statement is equivalent to the used operand in the first copy statement; wherein step (a)(5) of claim 10 includes the step of removing the second copy statement; and wherein the optimizing step further includes the step of repeating steps (a)(1)–(a)(5) for each copy statement in the computer procedure; whereby steps (a)(4) and (a)(5) are performed for each copy statement identified in step (a)(3).

13. The method of claim 10, further comprising the step of repeating steps (a)(1)–(a)(3) of claim 10 for every copy statement in the computer procedure to identify if the defined operand of any copy statement in the computer procedure has a uniquely reachable use in another copy statement in the computer procedure, and wherein step (a)(4) comprises the step of, after repeating steps (a)(1)–(a)(3) for every copy statement in the computer procedure to identify that the defined operand of a copy statement in the computer procedure has a uniquely reachable use in another copy statement in the computer procedure, performing dataflow analysis on the computer procedure to identify any copy statements having provably equivalent defined and used operands.

14. A computer system for compiling a computer procedure into a machine-readable representation, the computer procedure including at least one copy statement which includes a defined operand and a used operand, the computer system comprising:

(a) an optimizer that optimizes the computer procedure into an optimized representation, the optimizer including a redundant copy statement eliminating module that (1) identifies if a first copy statement in the computer procedure has a uniquely reachable use to a second copy statement and an additional, non-uniquely reachable use to another statement, and (2) if so, removes any redundant copy statements which have equivalent defined and used operands; and (b) a machine-readable code generator that generates a machine-readable representation of the computer procedure from the optimized representation.

15. The computer system of claim 14, further comprising a front end module that generates an intermediate representation from a source code representation of the computer procedure, wherein the optimizer operates on the intermediate representation of the computer procedure.

16. The computer system of claim 14, wherein the redundant copy eliminating module determines if the defined operand in the second copy statement is equivalent to the used operand in the first copy statement, and if so, removes the second copy statement.

17. The computer system of claim 16, wherein the redundant copy eliminating module identifies if the defined operand of any copy statement in the computer procedure has a uniquely reachable use in another copy statement in the computer procedure, and wherein the redundant copy eliminating module includes a dataflow analyzer that performs dataflow analysis on the computer procedure to identify any copy statements having provably equivalent defined and used operands.

18. A program storage device readable by a computer system, the program storage device tangibly embodying a program of instructions executable by the computer system to optimize a computer procedure by eliminating redundant copy statements during compilation of the computer procedure, the computer procedure having at least one copy statement which includes a defined operand and a used operand, the program comprising:

(a) an identifier that identifies if a first copy statement: in the intermediate representation has a uniquely reachable use to a second copy statement and an additional, non-uniquely reachable use to another statement; and (b) a redundant copy eliminator, responsive to the identifier, that removes any redundant copy statements which have equivalent defined and used operands.

19. The program storage device of claim 18, wherein the identifier determines if the defined operand in the second copy statement is equivalent to the used operand in the first copy statement, and wherein the redundant copy eliminator removes the second copy statement.

20. The program storage device of claim 18, wherein the identifier identifies if the defined operand of any copy statement in the computer procedure that has a non-uniquely reachable use also has a uniquely reachable use in another copy statement in the computer procedure, and wherein the redundant copy eliminator performs dataflow analysis on the computer procedure to identify any copy statements having provably equivalent defined and used operands.

21. A method of transferring a program product to a computer system, the method comprising the steps of:

(a) establishing a connection with the computer system; and (b) transmitting the program product to the computer system, the program product being executable by the computer system to optimize a computer procedure by eliminating redundant copy statements during compilation of the computer procedure, the computer procedure having at least one copy statement which includes a defined operand and a used operand, the program product executing the steps of:

(1) determining if the defined operand of a first copy statement in the computer procedure has a non-uniquely reachable use, and an additional, uniquely reachable use in a second copy statement in the computer procedure; and (2) removing any copy statement having equivalent defined and used operands.

* * * * *